United States Patent
Klingels

(10) Patent No.: US 10,677,080 B2
(45) Date of Patent: Jun. 9, 2020

(54) SEAL SYSTEM FOR A GUIDE BLADE SYSTEM OF A GAS TURBINE

(71) Applicant: MTU Aero Engines AG, Munich (DE)

(72) Inventor: Hermann Klingels, Dachau (DE)

(73) Assignee: MTU Aero Engines AG, Munich (DE)

( * ) Notice: Subject to any disclaimer, the term of this patent is extended or adjusted under 35 U.S.C. 154(b) by 63 days.

(21) Appl. No.: 15/814,612

(22) Filed: Nov. 16, 2017

(65) Prior Publication Data
US 2018/0135449 A1 May 17, 2018

(30) Foreign Application Priority Data
Nov. 17, 2016 (DE) .......................... 10 2016 222 608

(51) Int. Cl.
  *F01D 11/00* (2006.01)
  *F02C 7/28* (2006.01)
  (Continued)

(52) U.S. Cl.
  CPC .......... *F01D 11/001* (2013.01); *F01D 11/005* (2013.01); *F01D 25/243* (2013.01);
  (Continued)

(58) Field of Classification Search
  CPC .... F01D 11/001; F01D 11/005; F01D 11/122; F01D 11/127; F01D 25/243;
  (Continued)

(56) References Cited

U.S. PATENT DOCUMENTS 3,018,085 A * 1/1962 Welsh ................... F01D 11/025
  415/136
4,239,451 A * 12/1980 Bouru ................... F01D 11/025
  415/173.7
(Continued)

FOREIGN PATENT DOCUMENTS

DE    19960895    6/2001
DE    69817984    7/2004
(Continued)

*Primary Examiner* — Christopher Verdier
(74) *Attorney, Agent, or Firm* — Davidson, Davidson & Kappel, LLC

(57) ABSTRACT

A seal system for a moving blade system of a gas turbine includes a seal carrier including a ring section extending in the axial direction and the circumferential direction, on which a radially inner seal element is situated. A first flange section and a second flange section extend outwardly from the ring section in the circumferential direction and the radial direction and are situated at a distance from each other in the axial direction. An inner shroud section of at least one guide blade or of at least one guide blade segment includes a sealing section extending inwardly in the radial direction and in the circumferential direction, the sealing section being accommodated between the first flange section and the second flange section of the seal carrier and being connected thereto. A disk-like first seal is situated upstream from the first flange section with respect to the main flow direction of a working medium and partially abuts the first flange section radially inwardly. A radially outer free end projects over the first flange section in the radial direction and abuts the sealing section of the inner shroud section.

22 Claims, 3 Drawing Sheets

(51) Int. Cl.
  *F01D 25/24* (2006.01)
  *F16J 15/28* (2006.01)
(52) U.S. Cl.
  CPC ............ *F02C 7/28* (2013.01); *F05D 2220/32* (2013.01); *F05D 2240/11* (2013.01); *F05D 2240/15* (2013.01); *F05D 2240/57* (2013.01); *F16J 15/28* (2013.01)
(58) Field of Classification Search
  CPC ............ F05D 2240/15; F05D 2240/11; F05D 2240/57; F02C 7/28
  USPC ................................ 415/173.7, 174.4, 174.5
  See application file for complete search history.

(56) References Cited

U.S. PATENT DOCUMENTS

| | | | |
|---|---|---|---|
| 4,309,145 A * | 1/1982 | Viola | F01D 11/025 |
| | | | 415/173.7 |
| 4,721,434 A | 1/1988 | Marshall et al. | |
| 6,065,928 A | 5/2000 | Rieck, Jr. et al. | |
| 6,106,234 A | 8/2000 | Gabbitas | |
| 6,220,815 B1 | 4/2001 | Rainous et al. | |
| 7,972,107 B2 | 7/2011 | Dervaux et al. | |
| 8,540,479 B2 | 9/2013 | Awtar et al. | |
| 9,394,800 B2 | 7/2016 | Zheng et al. | |
| 9,416,676 B2 | 8/2016 | Gieg et al. | |
| 9,631,515 B2 | 4/2017 | Oyarbide et al. | |
| 9,644,488 B2 | 5/2017 | Boeck | |
| 2009/0246014 A1 | 10/2009 | Shapiro et al. | |
| 2011/0052376 A1 | 3/2011 | Sreeram | |
| 2014/0044537 A1 | 2/2014 | Hackenberg | |
| 2014/0105725 A1 | 4/2014 | Stiehler et al. | |
| 2015/0003970 A1 | 1/2015 | Feldmann et al. | |
| 2015/0010385 A1 | 1/2015 | Oyarbide et al. | |
| 2015/0192026 A1 | 7/2015 | Gieg et al. | |
| 2015/0377042 A1 | 12/2015 | Boeck | |
| 2016/0153302 A1 | 6/2016 | Samudrala et al. | |
| 2016/0169020 A1 | 6/2016 | Ryan et al. | |

FOREIGN PATENT DOCUMENTS

| | | |
|---|---|---|
| DE | 69926574 | 5/2006 |
| DE | 60028170 | 5/2007 |
| DE | 102008003301 | 7/2008 |
| DE | 102010037048 | 3/2011 |
| DE | 102011014292 | 9/2012 |
| DE | 102014100241 | 7/2014 |
| DE | 102013209746 | 11/2014 |
| DE | 102013011350 | 1/2015 |
| DE | 102015120128 | 6/2016 |
| EP | 1847687 | 10/2007 |
| EP | 2 696 039 A1 | 2/2014 |
| GB | 1322801 | 7/1973 |
| GB | 2022720 | 12/1979 |
| WO | WO 2015/197626 A1 | 12/2015 |

* cited by examiner

Prior Art

SEAL SYSTEM FOR A GUIDE BLADE SYSTEM OF A GAS TURBINE

This claims the benefit of German Patent Application DE 102016222608.8, filed Nov. 17, 2016 and hereby incorporated by reference herein.

The present invention relates to a seal system for a guide blade system of a gas turbine, in particular an aircraft gas turbine, preferably a low pressure turbine of a gas turbine, including a seal carrier, the seal carrier including a ring section extending in the axial direction and the circumferential direction, on which a radially inner sealing element is situated, and including a first flange section and a second flange section, which extend outwardly from the ring section in the circumferential direction and the radial direction and are situated at a distance from each other in the axial direction, and including an inner shroud section of at least one guide blade or of at least one guide blade segment of the guide blade system, the inner shroud section including a sealing section which extends inwardly in the radially direction and in the circumferential direction, the sealing section being accommodated between the first flange section and the second flange section of the seal carrier and being connected thereto.

The ring section of the seal carrier extending in the axial direction and the circumferential direction preferably has the shape of a self-enclosed ring. The term "section" in the phrase "ring section" relates to a section of the seal carrier and does not mean that the ring section is to be made from segmented individual parts in the circumferential direction, although a design of this type is not absolutely ruled out. The term "connected" in the aforementioned context furthermore does not mean that no relative movements are possible between the first flange section and the second flange section of the seal carrier, on the one hand, and the sealing section, on the other hand. Instead, a relative movement of this type, in particular in the radial direction, may be possible, for example with the aid of a spoke-centered bearing. The seal carrier could also be referred to as a static seal part.

Directional indications, such as "axial," "radial" and "circumferential," are, generally to be understood with reference to the machine axis of the gas turbine, unless otherwise explicitly or implicitly apparent from the context.

BACKGROUND

A seal system of this type, which may also be referred to as an intermediate stage seal, is known, for example, from EP 2 696 039 A1, also published as U.S. Patent Application Publication 2014/0044537 A1. In the seal system disclosed therein, the first flange section is pressed against the sealing section of the inner shroud section during operation, due to the pressure ratios in the turbine, so that a secondary sealing point is formed. However, hot working medium may nevertheless flow through the secondary sealing point, due to the pressure ratios (pressure difference over the guide blade system) and existing manufacturing tolerances. During startup of the turbomachine, in particular the two radially outwardly extending flange sections of the seal carrier, and thus the seal carrier itself, may be heated up thereby, whereby the latter's diameter is increased. A distance between the radially inner sealing element and the rotor-side sealing projections, which together form a primary sealing point, is enlarged hereby, so that the sealing action thereof deteriorates. The rotor-side sealing projections may also be referred to as sealing tips.

SUMMARY OF THE INVENTION

It is an object of the present invention to provide a seal system, in which the aforementioned disadvantages may be avoided or lessened.

The seal system of the present invention includes at least one disk-like first seal means situated upstream from the first flange section with respect to the main flow direction of a working medium, the first seal means at least partially abutting the first flange section radially inwardly and having a radially outer free end, which projects over the first flange section in the radial direction and abuts the sealing section of the inner shroud section.

The first seal means thus forms a kind of cover of the first flange section, so that the latter is not directly exposed to the hot flow of working medium. Moreover, the free end forms a so-called secondary sealing point together with the sealing section of the inner shroud section without the first flange section being necessary for the sealing action. The disk-like first seal means may also be referred to as a sealing disk. Within the meaning of the present invention, the term "radially outer free end" does not mean that the radially outer end of the first seal means is necessarily meant thereby. Instead, it is understood to be a section of the first seal means, which is situated radially outwardly from the section by which it at least partially abuts the first flange section and which has a kind of sealing edge for the purpose of forming the secondary sealing point. However, the first seal means may extend even farther outwardly radially beyond this sealing edge.

The first seal means may include a bent section radially outwardly in such a way that a radially outer end section, which includes the free end, essentially runs in the axial direction. The first seal means is thus designed in the manner of a sealing disk, the radially outer edge or the radially outer free end being bent in the direction of the sealing section of the inner shroud section. In other words, the free end of the first seal means abuts the sealing section, so that no completely planar contact of the first seal means is present. To be able to further improve the sealing action of the first seal means, it is also conceivable that the first seal means is pretensioned in such a way that it is securely pressed against the sealing section, in particular even when the pressure of the surrounding working medium is not so high.

The radially outer end section in the axial direction may furthermore be dimensioned in such a way that the first seal means is removed from the first flange section farther radially outwardly than radially inwardly. A clearance may be formed in the radial direction between the first flange section and the bent section of the first seal means. A separate pressure level may set in in this clearance. Since the secondary sealing point of the seal system according to the present invention also may generally not completely prevent the entry of hot working medium, it is advantageous to provide a cooling air supply to this clearance. The hot working medium thus reaches an area of the seal system where it comes into contact with the first flange section only after passing the secondary sealing point, so that the heating of the first flange section, and thus the entire seal system, may be reduced. If cooling air is conducted into the clearance, the heating may be even further reduced.

The seal system may furthermore include at least one disk-like second seal means situated downstream from the second flange section with respect to the main flow direction of the working medium, the second seal means at least partially abutting the second flange section radially inwardly and having a radially outer free end, which projects over the second flange section in the radial direction and abuts the sealing section of the inner shroud section. The second seal means is designed similarly or identically to the first seal means. The second seal means also forms a kind of cover for the second flange section.

The second seal means may include a bent section radially outwardly in such a way that a radially outer end section, which includes the free end, essentially runs in the axial direction. The radially outer end section in the axial direction may be dimensioned in such a way that the second seal means is removed from the second flange section farther radially outwardly than radially inwardly. Moreover, a clearance may be formed in the radial direction between the second flange section and the bent section of the second seal means. To be able to further improve the sealing action of the second seal means, it is also conceivable that the second seal means is pretensioned in such a way that it is securely pressed against the sealing section, in particular even when the pressure of the surrounding working medium is not so high.

A radially outer clearance may be formed in combination by the first seal means and the second seal means, which permits the through-flow of hot working medium after passing the secondary sealing point.

It is furthermore proposed that the first seal means and/or the second seal means, the first flange section and the second flange section are connected to the sealing section of the inner shroud section with the aid of a bolt-like or screw-like connection. The bolt-like or screw-like connection may permit a relative movement of the seal carrier with respect to the sealing section of the inner shroud section in the radial direction. The connection between the seal carrier and the sealing section may be designed, in particular, as a sliding block connection.

The seal system may include at least one rotor-side sealing projection, which is connected, in particular, to a moving blade system of the gas turbine and which is situated opposite the sealing element of the seal carrier in the radial direction. The sealing element and the sealing projection form a so-called first sealing point of the seal system.

The first flange section and the second flange section may have a variable expansion in the radial direction along the circumferential direction. The flange sections thus have a profile, radially outwardly, along the circumferential direction, in which elevations and recesses or hills and valleys, alternate. The first seal means and/or the second seal means are designed in such a way that they project over the areas having recesses as well as over the areas having elevations of the flange sections in the radial direction. Due to the provision of recesses in the flange sections, the available clearance delimited by the first seal means and/or the second seal means may be enlarged. In addition, a radial expansion of the flange sections, which is reduced compared to the prior art, causes these sections to heat up to a lesser degree during operation of the gas turbine, since the temperatures are higher radially outwardly, i.e. in the vicinity of a main flow channel for the hot working medium, than they are radially inwardly, where the temperatures are generally kept relatively low via a cooling air supply. The elevations of the flange sections of the seal system according to the present invention need to extend radially outwardly only to the extent that the area in which they cover the sealing section is sufficient to absorb the axial forces acting upon the seal carrier.

It is furthermore proposed that recesses or channels on the first flange section or on the second flange section, which are configured to supply colder working medium to the seal carrier as a leakage flow, are provided in a radially inner area, in which the first seal means abuts the first flange section or in which the second seal means abuts the second flange section. The colder working medium is supplied, in particular, from a radially inner area of the turbine, which does not correspond to the main flow channel.

The present invention furthermore also relates to a gas turbine, in particular an aircraft gas turbine, which includes at least one seal system described above, the seal system being preferably situated between two stages of a turbine, in particular a low pressure turbine.

The seal system according to the present invention permits a noticeably better sealing action at the secondary sealing point than is the case in the seal systems from the prior art, due to the provision of the first seal means, in particular because the manufacturing tolerances may be controlled better and a pretension may be provided. This also has an advantageous effect on the sealing action of the primary sealing point and thus increases the overall effect of the seal system. Namely, a reduction in the average temperature of the seal carrier, and thus less thermal expansion thereof, occurs due to the improved sealing action of the secondary sealing point and the reduction of the radial expansion of the two flange sections of the seal carrier. If the thermal expansion of the seal carrier may be reduced to a similar degree as is the case at the rotor-side sealing projections during startup of the gas turbine, the gap at the primary sealing point may be minimized.

BRIEF DESCRIPTION OF THE DRAWINGS

The present invention is explained below by way of example with reference to the attached figures and without a limiting effect.

DETAILED DESCRIPTION

Figure 1:
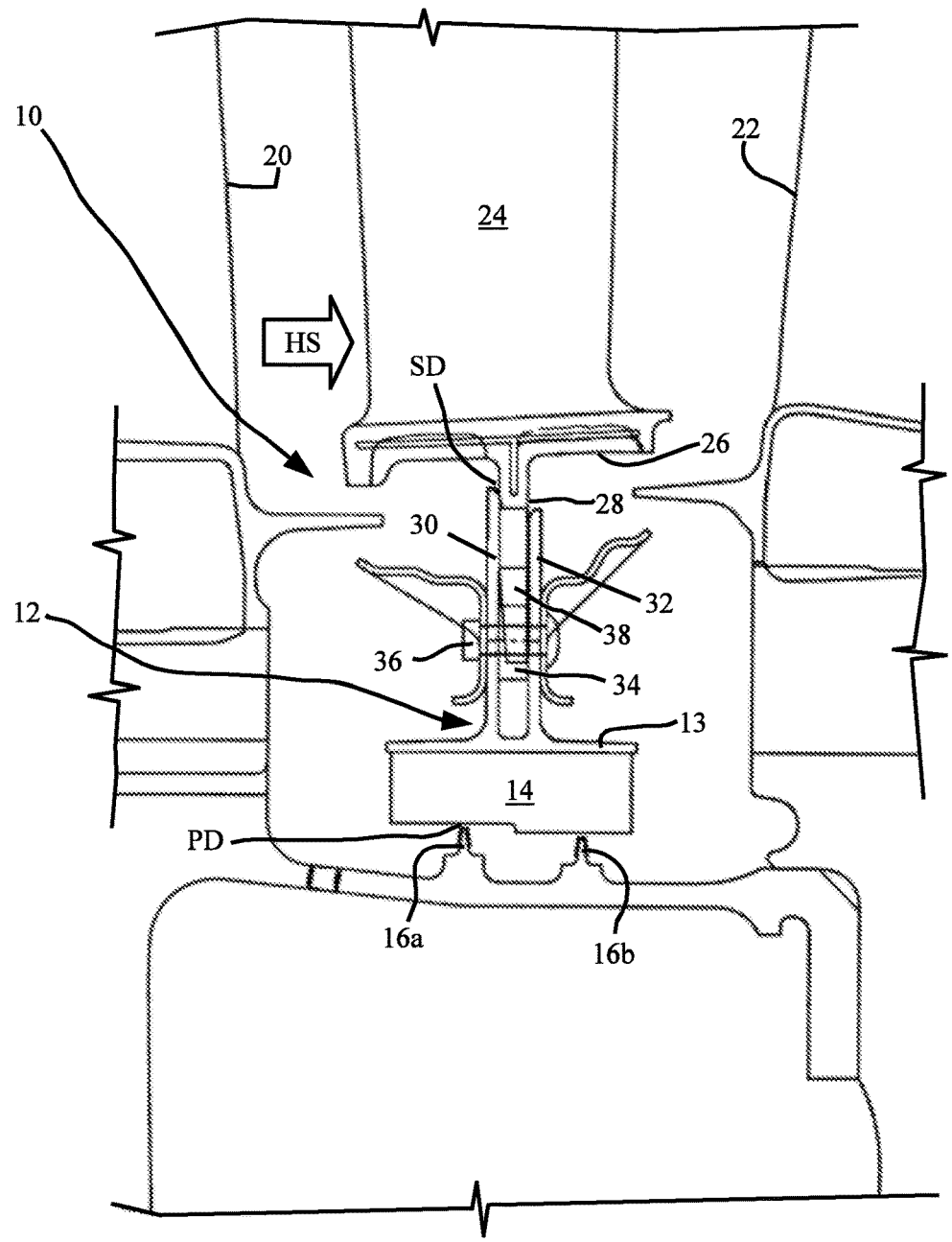
FIG. 1 shows a schematic and simplified sectional representation of one specific embodiment of a seal system according to the prior art along the axial direction.

FIG. 1 shows a schematic and simplified representation of a seal system 10 known from U.S. Patent Application Publication 2014/0044537 A1, hereby incorporated by reference herein and cited at the outset. Seal system 10 includes an in particular annular seal carrier 12. A ring section 13, on which a sealing element 14 is mounted, is provided radially inwardly on seal carrier 12. Sealing element 14 is provided with a so-called insertable design, so that sealing projections 16a, 16b present on the rotor side are able to grind into sealing element 14 during operation. Sealing element 14 and sealing projections 16a, 16b form a so-called primary sealing point PD.

A moving blade 20 of a first rotor stage and a moving blade 22 of a second rotor stage are indicated on the rotor side in FIG. 1. A guide blade 24 or a guide blade segment 24 is situated between the two moving blades 20, 22 in axial direction AR. Guide blade 24 includes an inner shroud section 26. Inner shroud section 26 is essentially provided with a T-shaped design. It includes a sealing section 28 extending in radial direction RR.

Seal carrier 12 includes a first flange section 30 and a second flange section 32. The two flange sections 30, 32 are connected to ring section 13, in particular forming a single piece therewith. Sealing section 28 of inner shroud section 26 is accommodated between the two flange sections 30, 32. A so-called sliding block 34 is furthermore fastened between the two flange sections 30, 32, in particular with the aid of a screw-like or bolt-like connection 36. Sliding block 34 engages with fork-shaped openings 38 on sealing section 28 and forms a spoke-centered bearing of seal carrier 12, which is designed to be closed in the circumferential direction, on the guide blade ring, which is formed by a plurality of guide blades 24 or guide blade segments 24.

Along axial main flow direction HS, a higher pressure P1 prevails upstream from seal carrier 12 than downstream pressure P2. Due to pressure P1, first flange section 30 is pressed against and abuts sealing section 28 during operation of the turbine. A secondary sealing point SD is formed radially outwardly hereby between a free end of first flange section 30 and sealing section 28 of inner shroud section 26. However, this secondary sealing point SD is not completely tight, for example due to unavoidable manufacturing tolerances, but rather permits a certain through-flow of hot working medium, which is able to enter the cavity radially inwardly of inner shroud section 26 in part from a main flow channel during operation of the gas turbine.

A temperature T1 of working medium radially outside in the area of secondary sealing point SD is higher than a temperature T2 radially inside in the area of primary sealing point PD. As is apparent from FIG. 1, first flange section 30 in the prior art and downstream also second flange section 32 are directly exposed to the hot working medium flowing past them. This results in a heating in the radially outer area of seal carrier 12, so that the latter expands, which is not desirable, in particular with respect to an associated gap enlargement between sealing projections 16a, 16b and sealing element 14 in the area of primary sealing point PD.

Figure 2A:
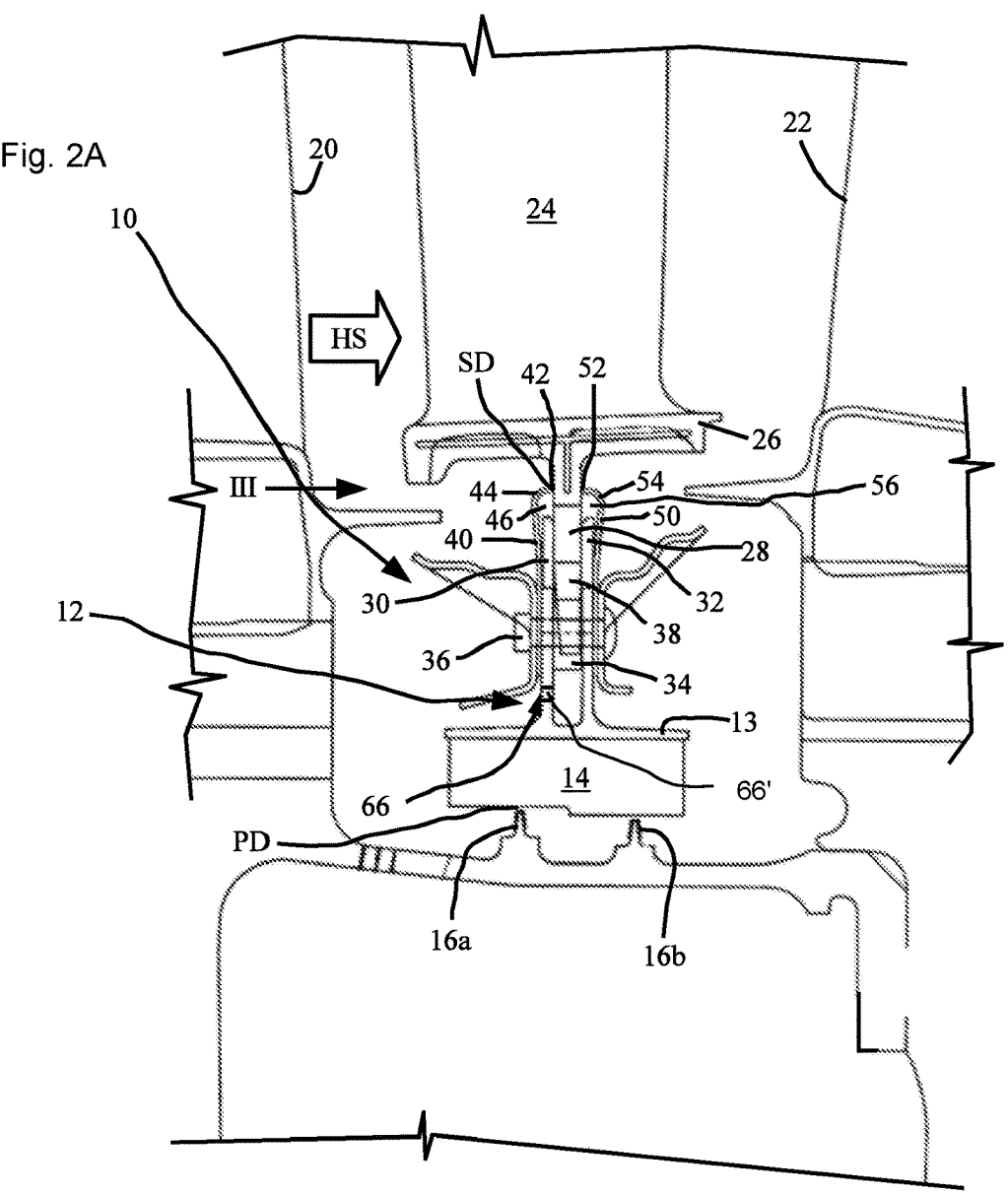
FIGS. 2A and 2B show a schematic and simplified sectional representations of a seal system according to the present invention along the axial direction in FIG. 2A and an enlarged schematic representation of a radially outer area of a first seal means in FIG. 2B.
Figure 2B:
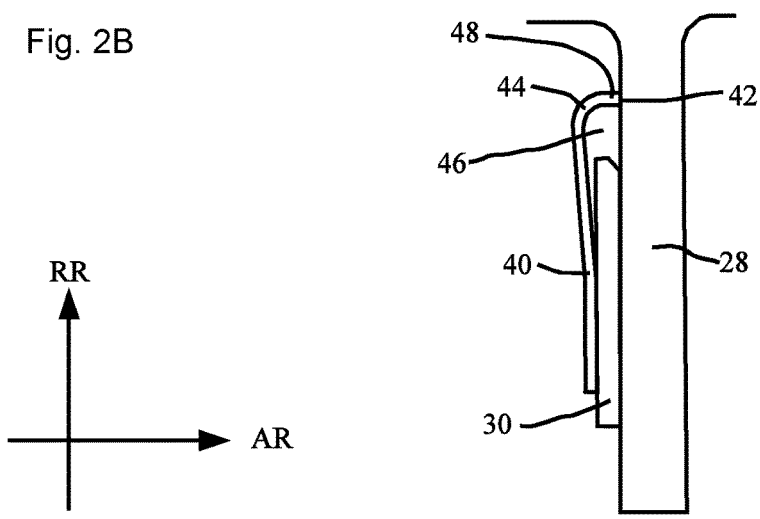

One specific embodiment of a modified seal system 10 according to the present invention is illustrated in FIGS. 2A and 2B. Seal system 10 includes an in particular annular seal carrier 12. A ring section 13, on which a sealing element 14 is mounted, is provided on seal carrier 12. Sealing element 14 is provided with a so-called insertable design, so that sealing projections 16a, 16b present on the rotor side are able to grind into sealing element 14 during operation. Sealing element 14 and sealing projections 16a, 16b form a so-called primary sealing point PD.

A moving blade 20 of a first rotor stage and a moving blade 22 of a second rotor stage are indicated on the rotor side in FIG. 2A. A guide blade 24 or a guide blade segment 24 is situated between the two moving blades 20, 22 in axial direction AR. Guide blade 24 includes an inner shroud section 26. Inner shroud section 26 is essentially provided with a T-shaped design. It includes a sealing section 28 extending in radial direction RR.

Seal carrier 12 includes a first flange section 30 and a second flange section 32. The two flange sections 30, 32 are connected to ring section 13, in particular forming a single piece therewith. Sealing section 28 of inner shroud section 26 is accommodated between the two flange sections 30, 32. A so-called sliding block 34 is furthermore fastened between the two flange sections 30, 32, in particular with the aid of a screw-like or bolt-like connection 36. Sliding block 34 engages with fork-shaped openings 38 on sealing section 28 and forms a spoke-centered bearing of seal carrier 12, which is designed to be closed in the circumferential direction, on the guide blade ring, which is formed by a plurality of guide blades 24 or guide blade segments 24 (also see FIG. 3).

Compared to FIG. 1, first flange section 30, in particular, has a shorter design in radial direction RR in the specific embodiment. According to the specific embodiment shown in FIG. 2, seal system 10 includes a first seal means 40. First seal means 40 is essentially provided with a disk or plate-shaped design. First seal means 40 projects radially outwardly over first flange section 30. It includes a free end 42 radially outwardly. The free end abuts a bent section 44. First seal means 40 forms secondary sealing point SD in the area in which free end 42 abuts sealing section 28 of inner shroud section 26. As is apparent from FIGS. 2A and 2B (enlarged schematic diagram), a clearance 46 is formed radially outwardly between first flange section 30 and first seal means 40. First seal means 40 thus forms a kind of cover of first flange section 30, so that the latter is not directly exposed to the hot working medium.

First seal means 40 is connected to seal carrier 12 in the area of screw-like or bolt-like connection 36 and planarly abuts first flange section 30 in the radial inner area. As is particularly apparent from FIG. 2B, bent section 44 and an end section 48 having free end 42 are designed to have an increasing distance from first flange section 30. First seal means 40 may be pretensioned in the direction of sealing section 28, so that free end 42 is pressed preferably reliably against sealing section 28 to reduce the passage of hot working medium in the area of secondary sealing point SD.

The seal system may also optionally include a second seal means 50 illustrated in FIG. 2A). Second seal means 50 also has a free end 52 and a bent section 54. The second seal means is situated downstream, and its free end 52 abuts sealing section 28. Second seal means 50 projects over second flange section 32 in the radial direction. A clearance 56 is formed between free end 52 and bent section 54 and the second flange section.

The functionality of second seal means 50 is similar to that of first seal means 40; in particular, the second seal means forms a kind of cover for second flange section 32, so that the latter is not directly exposed to the hot working medium. Second seal means 50 is also essentially provided with a disk-shaped design. Moreover, second seal means 50 may also be pretensioned in the direction of sealing section 28 of inner shroud section 26.

Figure 3:
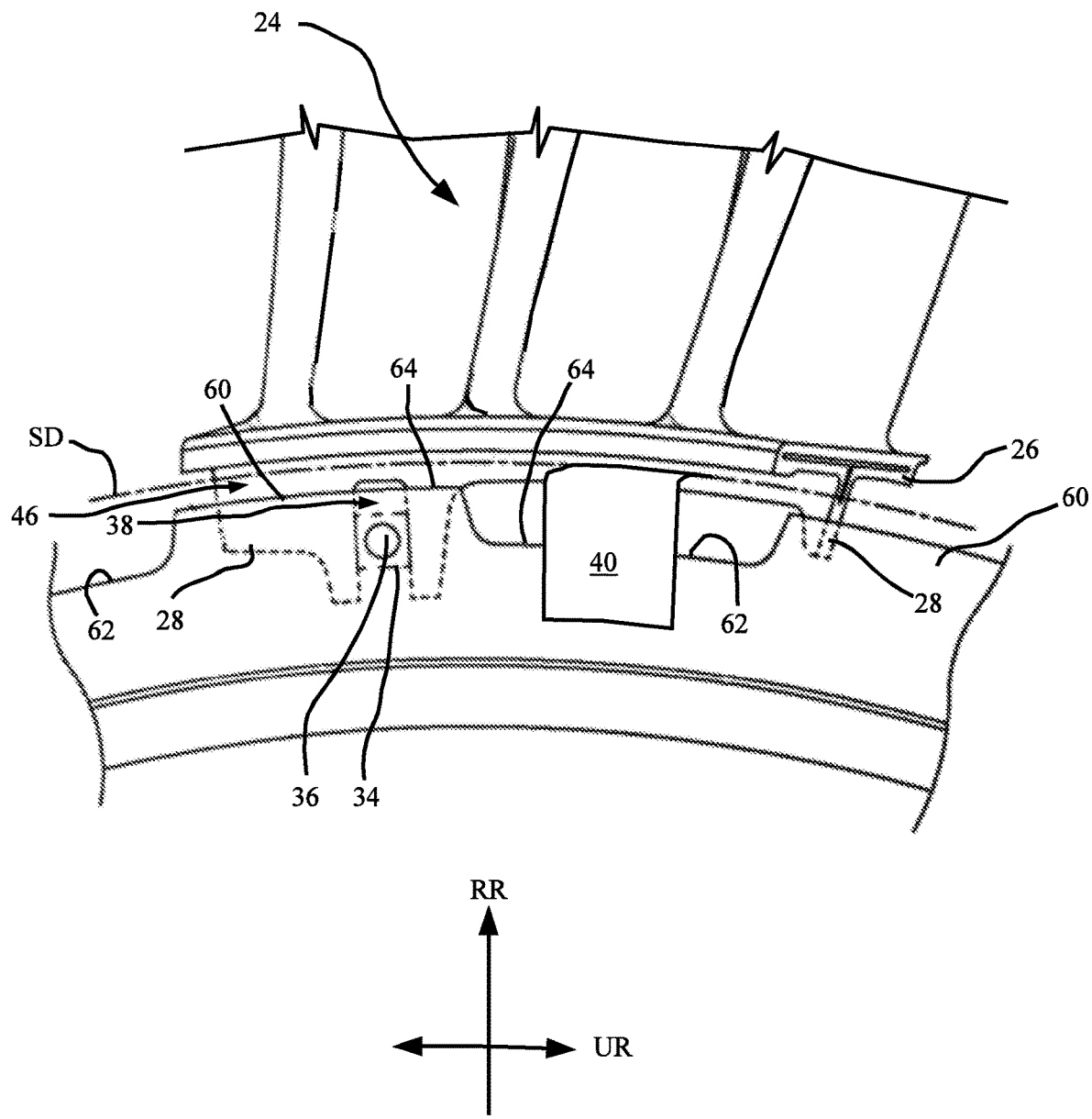
FIG. 3 shows a schematic and simplified view of the seal system in the axial direction, corresponding approximately to arrow III in FIG. 2A.

FIG. 3 shows a plan view of first flange section 30, approximately according to arrow III in FIG. 2A, first seal means 40 in FIG. 3 being only indicated on the right in part and greatly simplified so as not to completely cover first flange section 30. The dash-dotted line in FIG. 3 shows the area along which secondary sealing point SD is formed by first seal means 40, in particular its free end 32, together with sealing section 28.

First flange section 30 has alternating elevations 60 and indentations 62 along circumferential direction UR, which are designed to be of different heights in radial direction RR. One elevation 60 is provided, in particular in the area of the coupling with sealing section 28 of inner shroud section 26. It is also apparent from FIG. 3 that the dash-dotted line, which represents the location of secondary sealing point SD, has a larger radius than a radially outer edge 64 of first flange section 30. A clearance 46, which is covered by first seal means 40, is thus present between dash-dotted line SD and the first flange section along the circumferential direction.

With reference again to FIG. 2A, it should be further noted that recesses or channels 66' may be provided radially inwardly on first flange section 30 in area 66. Cooler secondary air or a cooling air flow may be supplied radially inwardly through recesses of this type to seal carrier 12, making it possible to further counteract a heating.

The presented seal system 10, as explained with reference to FIGS. 2A, 2B and 3, results as a whole in an improved sealing action in the area of secondary sealing point SD. Accordingly, only a small amount of hot working medium is able to flow past the secondary sealing point and reach the area of first flange section 30 or second flange section 32. A heating of flange sections 30, 32 may be counteracted hereby. As a result, seal carrier 12 expands less in the radial direction, so that the sealing action at primary sealing point PD is also improved.

LIST OF REFERENCE NUMERALS

10 seal system
12 seal carrier
13 ring section
14 sealing element
16a, 16b sealing projection
20 moving blade
22 moving blade
24 guide blade or guide blade segment
26 inner shroud section
28 sealing section
30 first flange section
32 second flange section
34 sliding block
36 screw- or bolt-like connection
38 fork-shaped opening
40 first seal means
42 free end
44 bent section
46 clearance
48 end section
50 second seal means
52 free end
54 bent section
56 clearance
60 elevation
62 indentation
64 radially outer edge
66 area for recesses or channels

What is claimed is:

1. A seal system for a moving blade system of a gas turbine, the seal system comprising:
    a seal carrier including a ring section extending in an axial direction and a circumferential direction, a radially inner seal element situated on the ring section, the seal carrier including a first flange section and a second flange section both extending outwardly from the ring section in the circumferential direction and a radial direction and situated at a distance from each other in the axial direction;
    an inner shroud section of a guide blade system, the inner shroud section including a seal section extending inwardly in the radial direction and in the circumferential direction, the seal section being accommodated between the first flange section and the second flange section of the seal carrier and being connected to both the first flange section and the second flange section,
    at least one disk-shaped first seal means situated upstream from the first flange section with respect to a main flow direction of a working medium, the first seal means at least partially abutting the first flange section radially inwardly and having a radially outer free end, the radially outer free end projecting over the first flange section in the radial direction and abutting the seal section of the inner shroud section.

2. The seal system as recited in claim 1 wherein the first seal means includes a bent section radially outwardly, in such a way that a radially outer end section including the free end runs in the axial direction.

3. The seal system as recited in claim 2 wherein the radially outer end section in the axial direction is dimensioned in such a way that the first seal means is removed from the first flange section farther radially outwardly than radially inwardly.

4. The seal system as recited in claim 2 wherein a clearance is formed in the radial direction between the first flange section and the bent section of the first seal means.

5. The seal system as recited in claim 1 further comprising at least one disk-shaped second seal means situated downstream from the second flange section with respect to the main flow direction of the working medium, the second seal means at least partially abutting the second flange section radially inwardly and having a radially outer second free end projecting over the second flange section in the radial direction and abutting the seal section of the inner shroud section.

6. The seal system as recited in claim 5 wherein the second seal means includes a bent section radially outwardly in such a way that a radially outer end section includes the second free end and runs in the axial direction.

7. The seal system as recited in claim 6 wherein the radially outer end section in the axial direction is dimensioned in such a way that the second seal means is removed from the second flange section farther radially outwardly than radially inwardly.

8. The seal system as recited in claim 6 wherein a clearance is formed in the radial direction between the second flange section and the bent section of the second seal means.

9. The seal system as recited in claim 1 wherein the first seal means and the first flange section are connected to the seal section of the inner shroud section with the aid of a bolt or screw connection.

10. The seal system as recited in claim 5 wherein the second seal means and the second flange section are connected to the seal section of the inner shroud section with the aid of a bolt or screw connection.

11. The seal system as recited in claim 9 wherein the bolt or screw connection permits a relative movement of the seal carrier with respect to the seal section of the inner shroud section in the radial direction.

12. The seal system as recited in claim 11 wherein the connection between the seal carrier and the seal section is designed as a sliding block connection.

13. The seal system as recited in claim 1 further comprising at least one rotor-side sealing projection connected to a moving blade system of the gas turbine and situated opposite the seal element of the seal carrier in the radial direction.

14. The seal system as recited in claim 1 wherein the first flange section and the second flange section have a variable expansion in the radial direction along the circumferential direction.

15. The seal system as recited in claim 1 wherein the first flange section or the second flange section have an area for providing recesses or channels configured to supply a colder working medium colder than the working medium of a main flow channel to the seal carrier as a leakage flow, the area being provided in a radially inner area, the first seal means abutting the first flange section in the radial inner area, or a second seal means abuts the second flange section in the radial inner area.

16. A gas turbine comprising the seal system as recited in claim 1.

17. The gas turbine as recited in claim 16 further comprising two stages, the seal system being situated between the two stages.

18. A low pressure gas turbine comprising the gas turbine as recited in claim 15.

19. An aircraft gas turbine comprising the seal system as recited in claim 1.

20. The seal system as recited in claim 1 wherein the first seal means forms a cover for the first flange section.

21. The seal system as recited in claim 1 further comprising at least one rotor-side sealing projection connected to a moving blade system of the gas turbine and situated opposite the seal element of the seal carrier in the radial direction to form a primary sealing point; the radially outer free end projecting over the first flange section in the radial direction and abutting the seal section of the inner shroud section as a secondary sealing point.

22. A seal system for a moving blade system of a gas turbine, the seal system comprising:
- a seal carrier including a ring section extending in an axial direction and a circumferential direction, a radially inner seal element situated on the ring section, the seal carrier including a first flange section and a second flange section both extending outwardly from the ring section in the circumferential direction and a radial direction and situated at a distance from each other in the axial direction; the first flange section being upstream of the second flange section with respect to a main flow direction of a working medium;
- at least one rotor-side sealing projection connected to a moving blade system of the gas turbine and situated opposite the seal element of the seal carrier in the radial direction to form a primary sealing point;
- an inner shroud section of at least one guide blade, the inner shroud section including a seal section extending inwardly in the radial direction and in the circumferential direction, the seal section being accommodated between the first flange section and the second flange section of the seal carrier and being connected thereto,
- at least one disk-shaped first seal means situated upstream from the first flange section with respect to the main flow direction of the working medium, the first seal means at least partially planarly abutting the first flange section radially inwardly and having a radially outer free end, the radially outer free end projecting over the first flange section in the radial direction and abutting the seal section of the inner shroud section as a secondary sealing point;
- wherein the first seal means includes a bent section radially outwardly, and a radially outer end section including the free end and running in the axial direction; wherein the radially outer end section in the axial direction is dimensioned in such a way that the first seal means is removed from the first flange section farther radially outwardly than radially inwardly; wherein a clearance is formed in the radial direction between the first flange section and the bent section of the first seal means, the first seal means in a direction of the seal section is pretensioned and forms a cover for the first flange section.

* * * * *